United States Patent
Gramkow et al.

[15] 3,696,281
[45] Oct. 3, 1972

[54] STARTING MEANS FOR A SINGLE-PHASE ASYNCHRONOUS MOTOR

[72] Inventors: Asger Gramkow, Augustenborg; Jorgen Hyldal, Sonderborg, both of Denmark

[73] Assignee: Danfoss A/S, Nordborg, Denmark

[22] Filed: June 2, 1971

[21] Appl. No.: 149,186

[30] Foreign Application Priority Data

June 10, 1970 Germany..........P 20 28 455.3

[52] U.S. Cl. ..............................318/221 E, 318/227
[51] Int. Cl. ..............................................H02p 1/44
[58] Field of Search........318/221 R, 221 E, 227, 229

[56] References Cited

UNITED STATES PATENTS

| | | | |
|---|---|---|---|
| 3,538,411 | 11/1970 | Knaver et al. | 318/221 E |
| 3,562,614 | 2/1971 | Gramkow | 318/221 E |
| 3,414,789 | 12/1968 | Prouty | 318/221 E |
| 3,530,348 | 9/1970 | Conner | 318/221 E |

*Primary Examiner*—Gene Z. Rubinson
*Attorney*—Wayne B. Easton

[57] ABSTRACT

The invention relates to a starting circuit for a single phase asynchronous electric motor having a main winding and a starting winding. The circuit comprises a pair of terminals across which the main winding of the motor is connected and across which in operation an AC current is supplied. Means including a PTC resistor are utilized which provide an AC voltage which decreases in amplitude after the motor start-up. An SCR is connected in series with the starting winding and is controlled by a network to which the decreasing AC voltage is supplied. This network has capacitor means for storing current which is then available to control the SCR during zero cross-overs of the single phase AC current.

3 Claims, 3 Drawing Figures

STARTING MEANS FOR A SINGLE-PHASE ASYNCHRONOUS MOTOR

The invention relates to a starting means for a single-phase asynchronous motor and comprising a controlled semi-conductor valve, through which current can pass in both directions and which is arranged in series with the starting winding and is controlled in dependence upon an A.C. voltage which decreases during start-up.

In a known circuit of this kind, a resistor is arranged in series with the main motor winding, and the voltage for the control electrode of the semi-conductor valve is tapped off at this resistor. Since the current through the main motor winding decreases during start-up, the voltage-drop also diminishes at the series resistor. When the voltage drops below a predetermined value, the semi-conductor valve is no longer ignited.

In the case of these and similar starting switch arrangements, the moment at which the semi-conductor valve is ignited id displaced as the control voltage decreases, since the required level for ignition is reached only at a certain moment after commencement of the particular half-wave. The consequence of this is that only portions of the particular half-wave are supplied to the starting winding. A number of higher harmonics occur, and this is undesirable in the supply system and can also lead to radio interference.

The object of the invention is to provide a starting means comprising a semi-conductor valve, in which means interference of this kind in the supply system and with radio reception is prevented.

According to the invention, and based on the initially described starting means, this object is achieved by providing, between the point at which voltage decreases and the control electrode of the semi-conductor valve, a control circuit which stores the voltage by means of a condenser in such manner that the voltage is available, at least at the subsequent phase zero cross-over, for controlling the semi-conductor valve.

Thus, as long as the decreasing voltage used for control purposes suffices for causing ignition, the semi-conductor valve is ignited at each commencement of the half-wave. Consequently, the starting winding can receive the full alternating current. Interference in the supply system and with radio reception during start-up is thus largely prevented.

A particularly simple arrangement results if the condenser is charged through a half-wave rectifier and has so great a discharge-time constant that, during start-up, it has a voltage sufficient for igniting the semi-conductor valve not only during the next zero cross-over after charging, but also during the next but one zero cross-over. It therefore suffices to charge the condenser in each second half-wave.

In a preferred embodiment, the condenser has a discharge circuit which consists of a resistor and the collector-emitter gap of a transistor, between which the control electrode of the semi-conductor valve is connected, the transistor being in the blocked condition during start-up, at least at the zero cross-over. If the transistor is in the blocked condition at the zero cross-over, the condenser voltage is applied to the control electrode of the semi-conductor valve, so that the latter ignites, assuming that the control voltage has not yet dropped below the level for ignition. To bring the transistor into the conductive state, the condenser can be discharged to a greater extent than in normal discharge as the result of leakage currents, through the control gap of the semi-conductor valve and through the blocked transistor. In this way, a particularly favorable effect on the end of the start-up cycle can be achieved.

For example, the base-emitter gap of the transistor can be bridged by a diode, the pole of which is opposed to the direction in which said gap passes current, and the gap can be supplied with the decreasing A.C. voltage through a series resistor. In this way, the transistor too is rendered conducting only in each second half-wave. It remains in the blocked condition from a moment shortly before a zero cross-over to a moment shortly after the following zero cross-over. Each time the condenser is charged by the maximum amplitude of the decreasing voltage, there occurs a brief discharge which, at the end of the start-up period, safely reduces the control voltage for the semi-conductor valve to a level below that at which ignition occurs.

In another embodiment the emitter of the transistor is connected to one of the poles of the semi-conductor valve, and the base to the other pole of the semi-conductor valve, through a series resistor and a diode, the diode having a polarity in the direction in which the base-emitter gap passes current. In this arrangement, the transistor remains in the blocked condition as long as the semi-conductor valve is immediately ignited at zero cross-over. If however, the condenser voltage no longer suffices to cause ignition at zero cross-over, the transistor passes to the conductive state. Thus, any possibility of the semi-conductor valve igniting is suppressed, even if the increasing voltage should reach a valve exceeding the level for ignition.

The decreasing voltage is preferably tapped off at a voltage divider comprising a fixed resistor and a PTC-resistor. With this voltage divider, the resistance of the PTC-resistor rises as a result of the heating that occurs with time, so that the length of the starting up operation can thus be set.

A particular advantage accrues if a series resistor and, optionally, a start-up condenser is connected between the semi-conductor valve and the starting winding, and if the voltage divider bridges the semi-conductor valve and the series resistor. Since the semi-conductor valve is largely ignited during the entire period, and the resistance of the series resistor through which the starting winding current flows is small as compared with the resistance of the voltage divider, an almost constant voltage, which can be divided in the required manner with the aid of the PTC-resistor, is present at the voltage divider.

The invention will now be described in more detail by reference to an embodiment illustrated in the drawing, in which.

Figure 1:
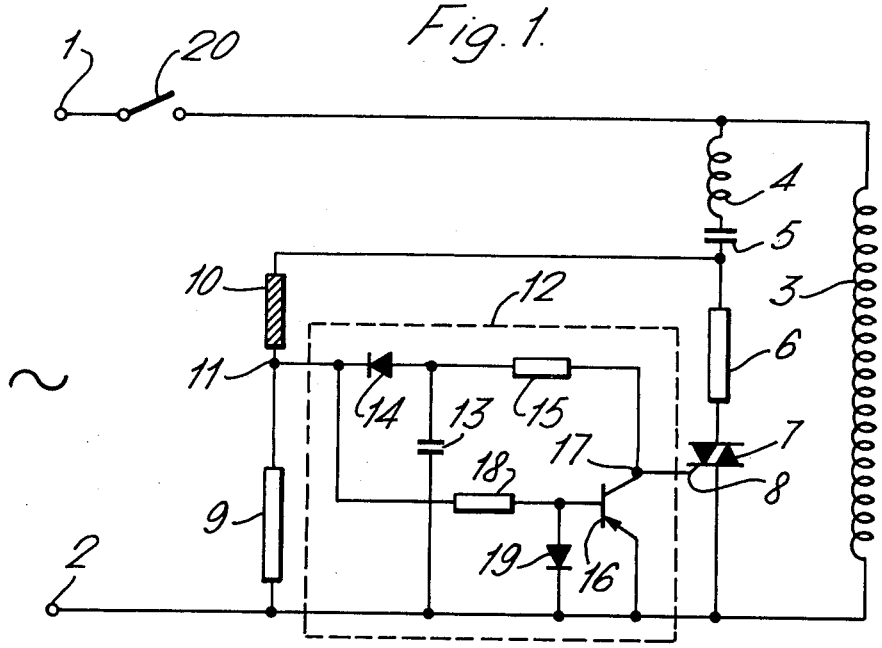
FIG. 1 is a circuit diagram for the starting means according to the invention.

A main winding 3 and a starting winding 4 of a single-phase asynchronous motor are connected to the terminals 1 and 2 of a single-phase A.C. system. Connected in series with the starting winding 4 is a start-up condenser 5, a series resistor 6 and a semi-conductor valve 7 which can pass current in both directions and comprises a control electrode 8. A voltage divider, consisting of a steady-current resistor 9 and a PTC-resistor 10, bridges the series resistor 6 and the semi-conductor valve 7. A.C. voltage is tapped off at a point 11 on the voltage divider, and this voltage influences the control electrode 8 of the semi-conductor valve 7, a control circuit 12 being provided between the voltage divider and said electrode.

The control circuit 12 contains a condenser 13 which is charged through a half-wave rectifier 14 with voltage equal to the amount of the voltage-drop at the resistor 9. Associated with the condenser 13 is a discharging circuit which consists of a resistor 15 and the collector-emitter gap of a transistor 16. The control electrode 8 is connected at a point 17 between these two elements. The base of the transistor 16 is connected to the tap-off point 11 through a series resistor 18. The base-emitter gap 16 is bridged by a diode 19 of opposite polarity.

The system is switched in with the aid of a switch 20.

The mode of operation is as follows: When the switch 20 is closed, current flows through the main winding 3 and through the series arrangement consisting of the elements 9, 10, 5 and 4. Consequently, there occurs at the resistor 9 and A.C. voltage $U_{11}$ which, since the PTC-resistor 10 gradually warms up, decreases during start-up. Because of the half-wave rectifier 14, the condenser 13 is influenced only by each second half-wave $U_G$ of the voltage $U_{11}$. The voltage $U_{11}$ is also applied to the base-emitter gap of the transistor 16. Since however, this gap is short-circuited by the diode 19 during one of the half-waves, this base-emitter gap is also controlled by the voltage $U_G$. When the voltage $U_{BE}$ is that voltage at which the transistor passes to the conductive state, the transistor is blocked during the time-spans $z$.

Figure 2:
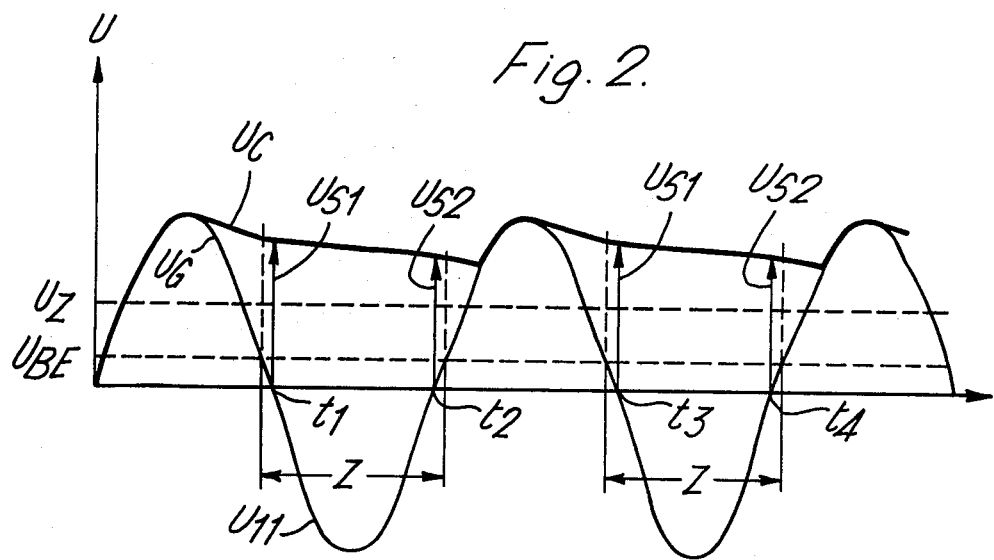
FIG. 2 is a graph in which some of the voltages occurring in the switching arrangement are plotted against time.

The voltage $U_C$ at the condenser has the following form: The condenser is charged to the maximum of the voltage $U_G$. It is then discharged through the discharging circuit by means of the resistor 15 and the transistor 16 until, shortly before the first zero cross-over $t_1$, the transistor passes to the blocked state and further discharge of the condenser 13 is possible only to the extent of the leakage currents. Shortly after the second zero cross-over $t_2$, the transistor 16 becomes conductive again, and the condenser is again discharged until the voltage $U_G$ again takes over the charging function. This cycle is repeated in each second half-wave. As soon as the transistor 16 blocks, the full condenser voltage $U_C$ is applied to the control electrode 8. It will be seen from FIG. 2 that for each zero cross-over $t_1$, $t_2$, $t_3$ etc., a control voltage $U_{S1}$ or $U_{S2}$, supplied by the condenser, is applied to the control electrode 8, although this condenser is loaded only in each second half-wave. The semi-conductor valve 7 therefore opens at the commencement of each half-wave, so that the starting winding 4 is provided with the full alternating current. This cycle is continued until the control voltage $U_{S1}$ or $U_{S2}$ falls below the ignition voltage $U_Z$, which must be applied to the control electrode 8 in order to ignite the valve 7.

Figure 3:
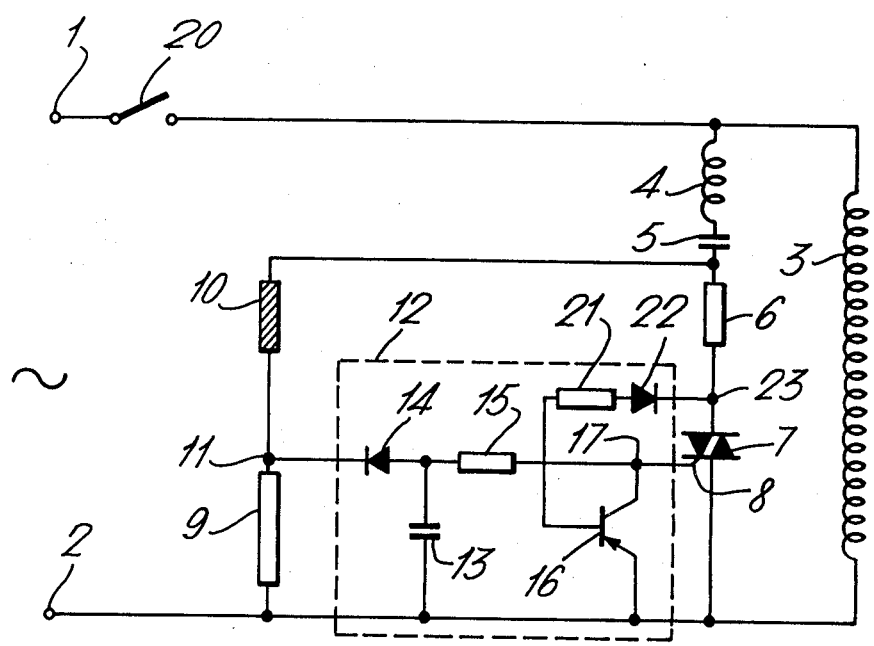
FIG. 3 is the circuit diagram relating to a second embodiment of the invention.

In the embodiment shown in FIG. 3, the same reference numerals are used as in FIG. 1 for designating like components. The embodiment of FIG. 3 differs from that of FIG. 1 in that in FIG. 3 the base of the transistor 16 is connected to a point 23 through a series resistor 21 and a diode 22 having the same polarity as the base-emitter gap; this point 23 is connected to that pole of the semi-conductor valve 7 that lies opposite the pole connected to the emitter of the transistor 16.

In this arrangement, the transistor 16 is in the blocking condition as long as the semi-conductor valve 7 is ignited by the voltage from the condenser 13 each time zero-cross-over occurs. If however, the condenser voltage 13 has dropped to a level which no longer suffices for ignition, the valve 7 remains blocked after zero cross-over, and the transistor 16 is caused to pass to the conductive state. Ignition of the valve 7 is then prevented from occurring, even if the voltage-drop at the resistor 9 should reach a maximum value which is in excess of the ignition voltage $U_Z$ of the valve 7. The blocking of the semi-conductor valve thus occurs instantaneously. This mode of action corresponds to that of an on-off relay switch.

The following values apply in the case of an embodiment as in FIG. 3:

| | |
|---|---|
| resistor 9 | 330 ohm |
| PTC-resistor 10 | 1000 ohm in the cold condition |
| series resistor 6 | 25 ohm |
| series resistor 21 | 47 kilohm |
| discharging resistor 15 | 220 ohm |
| condenser 13 | 100 F |
| starting condenser 5 | 120 F |

The switching arrangement offers the further advantage that a very inexpensive starting condenser 5 can be used which, in the case of a supply voltage of 220 V, needs to be capable of carrying a load of only 150 V, whereas the same starting condenser, if used in combination with a normal starting relay, must be able to carry a voltage of more than 300 V. If the rotor should be blocked, the PTC-resistor 10 warms up so that after the predetermined starting period the valve 7 blocks. The starting winding 4 cannot therefore be overloaded.

The voltage divider 9, 10 can also be directly connected between two supply terminals.

We claim:

1. A starting circuit for a single-phase asynchronous electric motor having a main winding and a starting winding, the circuit comprising a pair of terminals across which the main winding of the motor is connected and across which in operation a single-phase alternating current is supplied, means to derive from across said terminals an alternating current voltage which decreases in amplitude with time from initiation of start-up of the motor, a bi-directionally conducting semiconductor controlled device connected in a series path with said starting winding across said terminals and having a control electrode, and a control network to which said alternating current voltage which decreases in amplitude is supplied and which is connected to said control electrode, said network including means to store current which is then available to control the semiconductor control device during zero cross-overs of said single-phase alternating current, said control network including a half-wave rectifier and a capacitor which in operation is charged by way of said rectifier during alternate half-waves of said single-phase alternating current by said alternating current voltage which decreases in amplitude, the discharge time of said capacitor being such that said capacitor stores enough current during each said half-wave to control the semiconductor controlled device during the next and the next but one zero cross-over of said single-phase alternating current, said capacitor having a discharge circuit comprising a resistor and the collector-emitter path of a transistor connected in series, said control electrode being connected to the junction of said resistor and said collector-emitter path, and the control network further includes means to control said transistor to be non-conducting at least during each zero cross-over of said single-phase alternating current.

2. A starting circuit according to claim 1 wherein the collector of said transistor is connected to said control electrode and the base-emitter junction of said transistor is bridged by a diode poled in the reverse direction to said junction, and said alternating current voltage which decreases in amplitude is supplied by way of a resistor to the base electrode of said transistor.

3. A starting circuit according to claim 1 wherein the collector of said transistor is connected to said control electrode, and connected in parallel with said semiconductor controlled device is a series path comprising the base-emitter junction of said transistor, a resistor and a diode poled in the same direction as said junction.

* * * * *